June 30, 1925.
H. W. McQUAID ET AL
1,544,259
DEVICE FOR AND SYSTEM OF REGULATING TEMPERATURES
Filed March 2, 1922    4 Sheets-Sheet 1
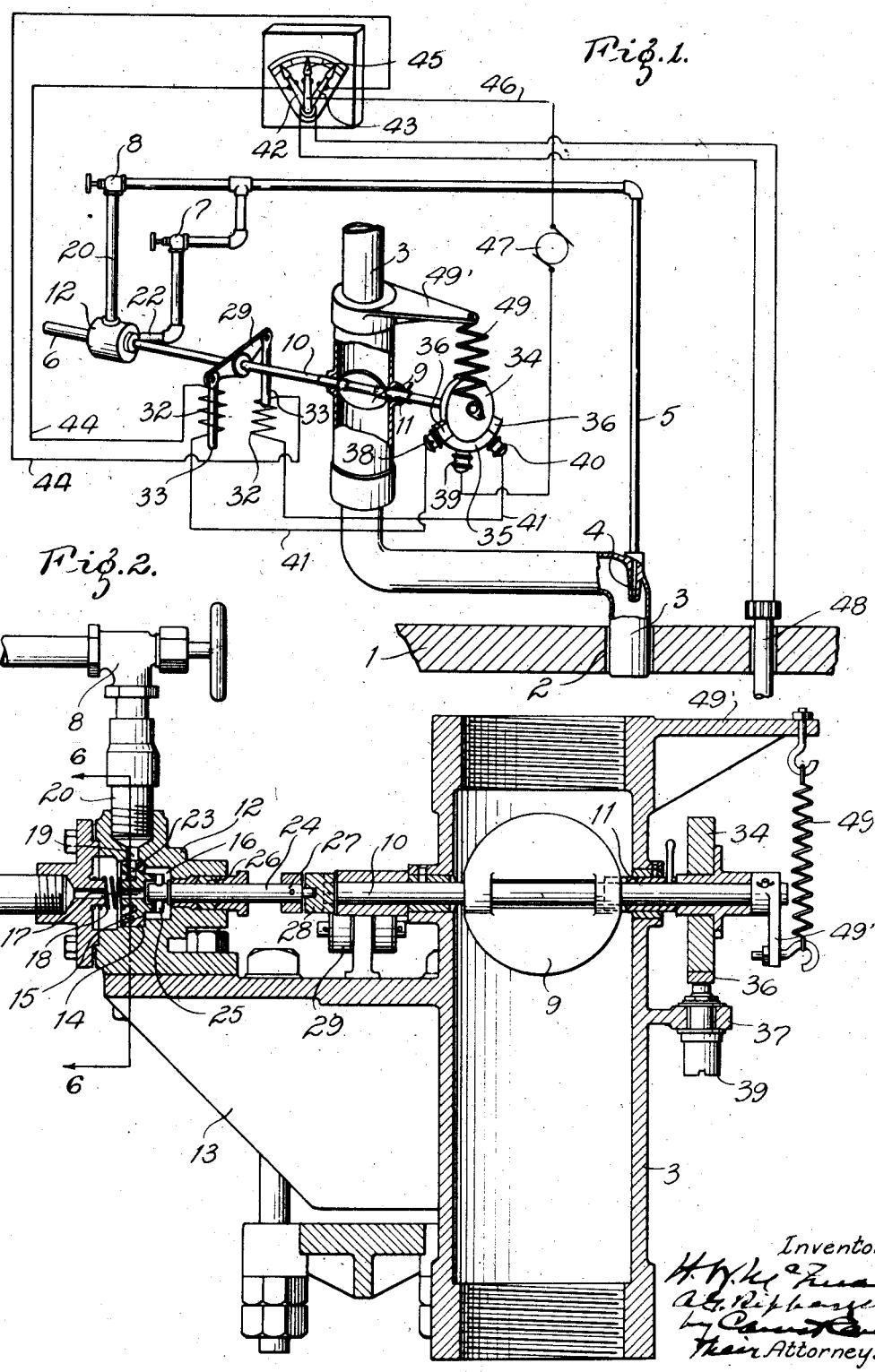

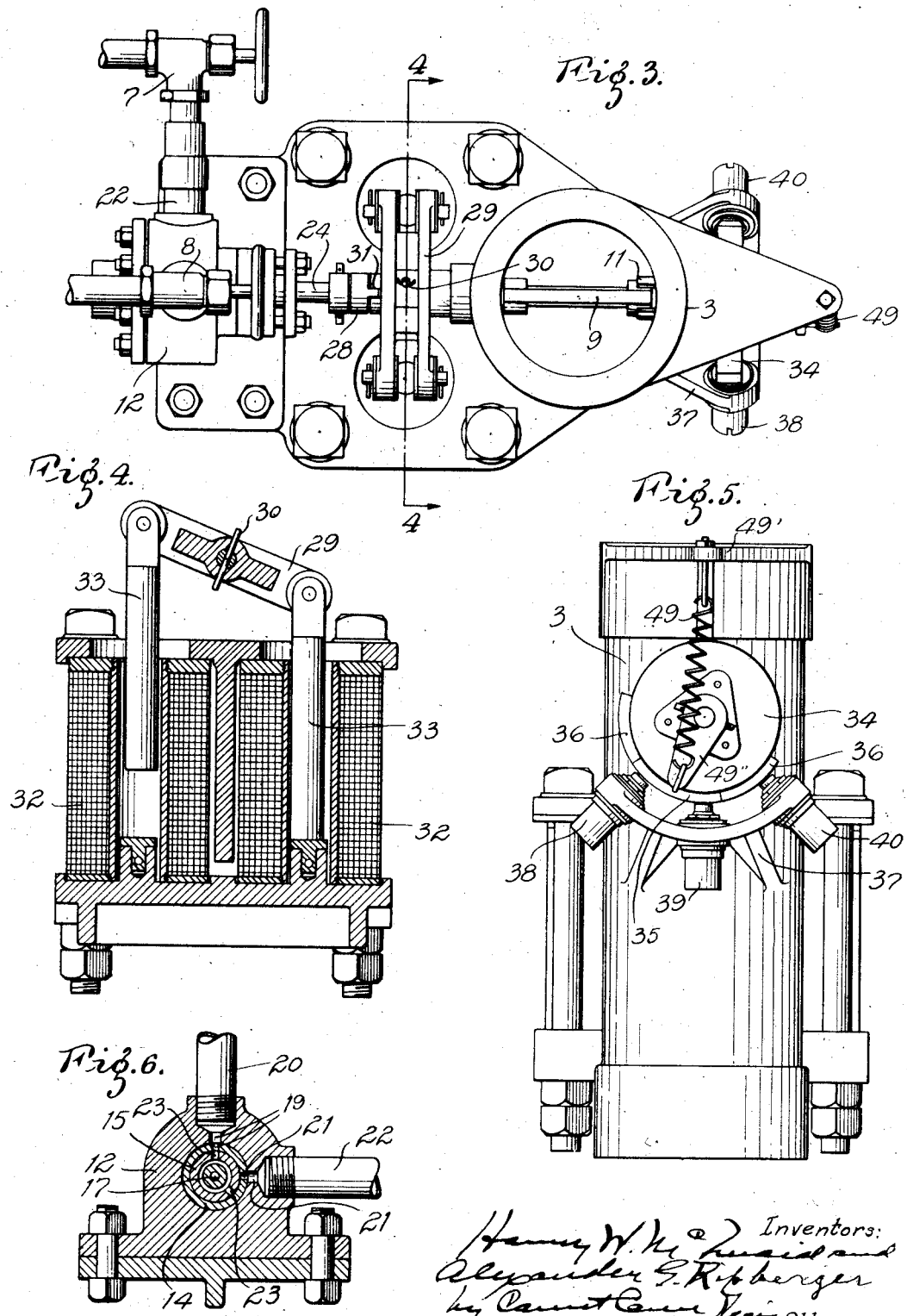

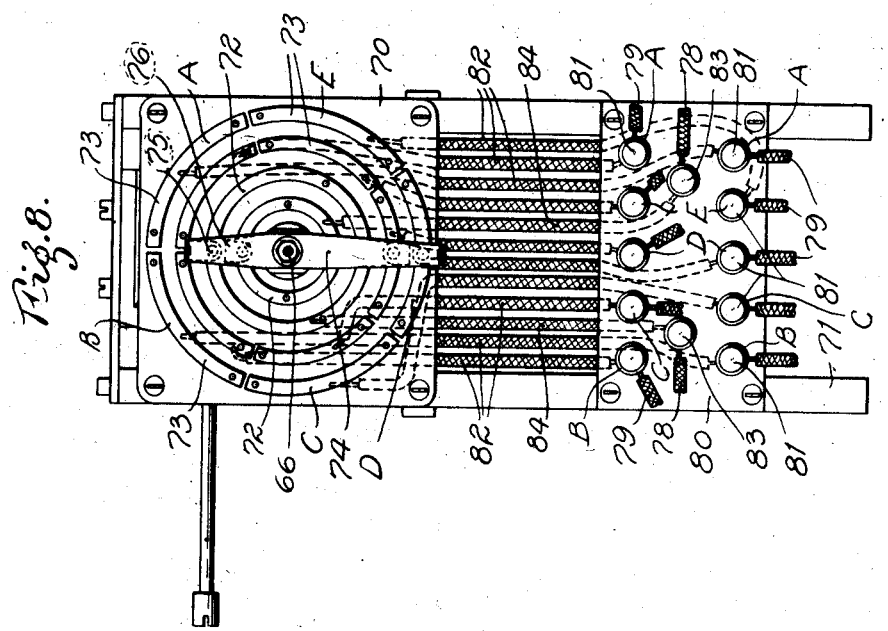
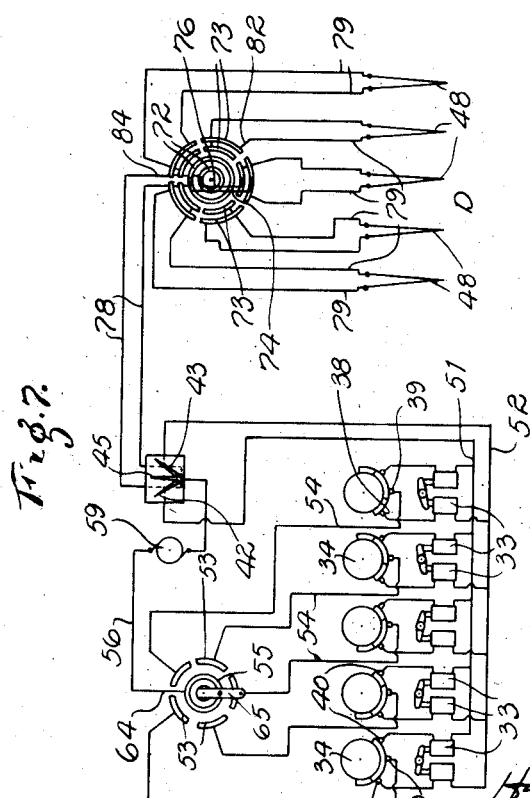

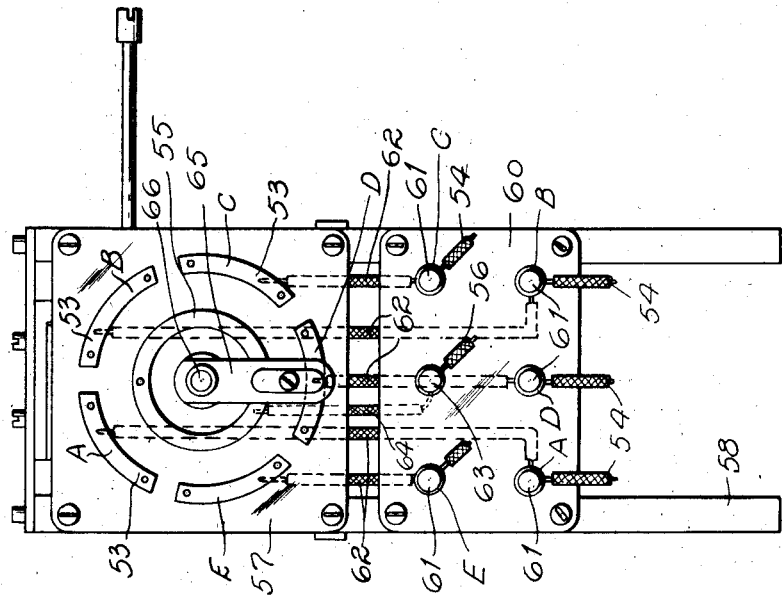
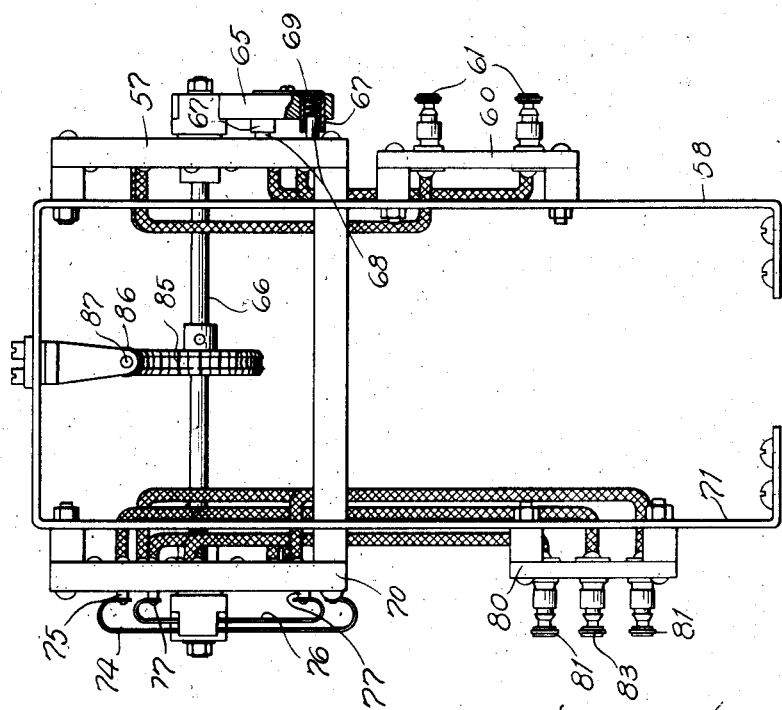

Patented June 30, 1925.

1,544,259

UNITED STATES PATENT OFFICE.

HARRY W. McQUAID AND ALEXANDER G. RIPBERGER, OF CANTON, OHIO, ASSIGNORS TO THE TIMKEN ROLLER BEARING COMPANY, OF CANTON, OHIO, A CORPORATION OF OHIO.

DEVICE FOR AND SYSTEM OF REGULATING TEMPERATURES.

Application filed March 2, 1922. Serial No. 540,661.

*To all whom it may concern:*

Be it known that we, HARRY W. McQUAID and ALEXANDER G. RIPBERGER, citizens of the United States, and residents of the city of Canton, in the county of Stark and State of Ohio, have invented a new and useful Improvement in Devices for and Systems of Regulating Temperatures, of which the following is a specification.

Our invention relates to devices for regulating temperatures and has for its principal objects to provide a device that is simple and inexpensive to operate, that will not easily get out of order, and that will accurately regulate temperatures. Another principal object is to provide a system of regulating the temperature of a plurality of furnaces or other units with one heat responsive instrument and switching mechanism. The invention consists principally in the parts and combinations of parts and in the system hereinafter described and claimed.

In the drawings, which form part of this specification and wherein like reference characters indicate like parts wherever they occur, Fig. 1 is an isometric view of a temperature regulating device embodying our invention;

Fig. 2 is a sectional view thereof;

Fig. 3 is a top plan view thereof;

Fig. 4 is a sectional view on the line 4—4 of Fig. 3;

Fig. 5 is an end view;

Fig. 6 is a sectional view on the line 6—6 of Fig. 2;

Fig. 7 is a diagrammatic view of a temperature regulating system embodying our invention;

Fig. 8 is an end view of the switch member of said system;

Fig. 9 is a side view thereof, and

Fig. 10 is an end view from the end opposite that from which Fig. 8 is taken.

A furnace, oven or the like 1 is provided with an opening 2 into which projects the end of a pipe 3 that is supplied with air. A burner nozzle 4, using oil for example as fuel projects into the air pipe 3, and is supplied by it with the air required for the fuel to burn. The nozzle 4 is connected with a pipe 5 that supplies it with fuel, and said fuel pipe 5 is supplied from the main fuel supply pipe 6 through a large (or high temperature) fuel supply valve 7 or a small (or low temperature) fuel supply valve 8, as will be more fully described hereinafter. The air pipe 3 contains a valve or damper 9 that is mounted on a shaft 10 whose ends project outside of the air pipe. The damper 9 is adapted to regulate the supply of air to conform to the amount of fuel being supplied to the nozzle. Preferably the damper 9 is provided with a central sleeve portion 11 that closely hugs the shaft 10 and projects through the air pipe 3 and is secured to the shaft 10 outside of said air pipe. Thus the damper 9 may be adjusted.

The main fuel supply pipe 6 delivers the fuel to the interior of a fuel valve housing 12 that is conveniently supported on a bracket 13 projecting from the air pipe 3. The valve housing 12 is preferably provided with a conical valve seat 14 in which is disposed a conical valve 15. The housing 12 is provided with a chamber 16 on the other side of the valve 15 from the pipe 6, and the valve has an opening 17 therethrough so that fuel may pass through and the pressure be equalized on both sides of said valve 15, thus preventing the valve from wedging in its seat and making it easier to operate. A spring 18 is provided to hold the valve 15 in its seat 14 when the fuel pressure is off.

The valve housing 12 and the valve seat 14 are provided with alining openings 19 that communicate with a fuel pipe 20 that is provided with the adjustable valve 8 and said valve housing 12 and the valve seat 14 are also provided with alining openings 21 that communicate with a second fuel pipe 22 that is provided with the adjustable valve 7. The valve 15 is provided with passageways 23 whereby fuel may pass from the valve housing 12 into either the fuel pipe 20 or the other fuel pipe 22. The valve 15 is adapted to be oscillated and when one of the valve passageways 23 is in register with the opening leading into a fuel pipe, the other passageway is out of register. The adjustable valve 7 is set to create a higher temperature than that desired for the furnace and the other adjustable valve 8 is set to create a lower temperature.

A shaft 24 is connected to the fuel valve 15 by a loose or universal joint 25. The shaft 24 extends through the valve housing 12 and suitable packing glands 26 are provided for the shaft 24 to prevent leakage of fuel from the housing 12. The other end 27 of the shaft 24 is connected by a universal joint 28 to the shaft 10 on which the damper 9 is mounted. By providing the shaft 24 with universal joints at both ends, it is free to adjust itself to the packing 26 without impairing the proper seating of valve 15 and the easy turning of shaft 10 in its bearings. Mounted on said shaft 10 is a hanger arm 29 that projects from both sides of the shaft 10. The hanger arm 29 is mounted to rock with the shaft 10 as by means of a pin 30 and has a recess 31 into which the floating member of the universal joint 28 projects.

Mounted on the bracket member 13 that projects from the air pipe 3 are solenoid coils 32 whose cores 33 are supported from the ends of the hanger arm 29. As one or the other of the solenoids is operated by the hereinafter described means the shafts 10 and 24 are rocked and the fuel valve 15 and the damper 9 are turned.

Fixed on the shaft 10 is disk 34 that has an arcuate electrical conductor 35 secured thereon and that may have arcuate insulating members 36 secured thereto at the sides of said conductor 35. Supported on a projection 37 on the air pipe 3 and arranged in an arc to contact with the conductor 35 and insulating members 36 of the disk 34 are contact members 38, 39 and 40 that are disposed so that the middle contact member 39 is always in contact with the conductor 35 and the other contact members 38 and 40 are alternately in contact therewith. The contact members 38 and 40 are connected respectively with the solenoid coils 32, by wires 41 and the coils 32 are connected respectively with pointers 42 and 43 of a temperature indicator or the like by wires 44. The middle contact member 39 is connected with the indicating pointer 45 of said temperature indicator by a wire 46. A source of power 47 is cut into the wire 46 to furnish the current to operate the solenoids.

A thermocouple 48 in the furnace is connected with the indicating pointer 45 of said temperature indicator in such a way that the current generated by the thermocouple tends to deflect said pointer 45 in one direction (to the right).

The pointer 42 of the temperature indicator is set at a predetermined point below the desired furnace temperature and the pointer 43 is set at a predetermined point above the desired temperature.

Assuming that the parts are in the positions shown in Fig. 1, if the temperature of the furnace increases the indicating pointer 45 will move to the right and will contact with the pointer 43, thus closing the circuit through the solenoid 33 whose core is up and through the contact members and causing said solenoid core to be lowered, thus turning the fuel valve 15 and the air damper 9 and turning the disk 34 so that its conductor member 35 is out of contact with the contact member 40 of the solenoid that has just been operated, and is in contact with the contact member 38 of the other solenoid.

Thus so long as the temperature of the furnace remains above that desired, the valve will not be again operated. If the pointer contacts again with the high temperature pointer, the electric circuit will not be closed because of the position of the disk 34. When the temperature of the furnace has lowered sufficiently, the pointer 45 contacts with the low temperature pointer 42 and a circuit is closed through the other coil 32, whose core 33 is lowered to turn the valves, so that fuel and air will be admitted to the burner in larger quantities.

A spring 49 secured to a projection 49' on the air pipe and to an arm 49'' on the disk 34 tends to hold it in moved position and prevents accidental turning of the valves due to rebounding of the solenoid cores.

In Figs. 7 to 10 is illustrated a system whereby the temperature of a plurality of furnaces is regulated by means of one temperature indicator. The system comprises a plurality of valve operating devices of the kind hereinbefore described, a temperature indicating instrument, and means for co-ordinating the respective electric circuits of said valve operating devices with the corresponding thermoelectric currents acting on said temperature indicating instrument.

In the preferred form, the contact members of the low and high temperature pointers 42 and 43 are connected respectively with one coil of each pair of solenoids 33, by wires 51 and 52, and hence with the brushes 40 and 38. The middle contact member 39 of each solenoid contact disk is connected with an arcuate conductor 53 by a wire 54, said arcuate conductors being arranged in a circle concentric with an annular conductor 55 that is connected with the indicating pointer 45 of the indicator by a wire 56. Preferably said conductors 53 and 55 are mounted on a non-conducting plate 57 and are disposed in suitable recesses in said plate so as to be flush with the upper surface thereof. The plate is mounted on a suitable base 58. A source of power 59 forms part of the connection between the conductor 55 and the indicating pointer 45.

There is one arcuate conductor 53 for the valve operating mechanism of each furnace. The conductors 53 are marked A, B, C, D, E respectively in the drawings. Preferably a non-conducting plate 60 may be mounted on the base 58. On said plate are a plurality of binding posts 61 (A to E) to which are secured the ends of the respective wires 54. Each of said binding posts 61 is connected to the corresponding arcuate conductor 53 by a wire 62 (A to E). The plate 60 is also provided with a binding post 63 to which is secured the wire 56 and which is connected with the annular conductor 55 by a wire 64.

An arm 65 is mounted on one end of a rotary shaft 66 that is mounted concentric with the arcuate conductors 53 and the annular conductor 55. In holes in the arm are mounted guide tubes 67 in which are disposed plungers or contact brushes 68 that press against the arcuate conductors 53 and and the annular conductor 55 respectively. Springs 69 in the tubes force the brushes 68 against the conductors. The two brushes 68 are so connected that an electric current may flow from one to the other. They are, however, electrically insulated from the arm 65.

Disposed transversely of the other end of the shaft 66 is a plate 70 that is mounted on a suitable base 71. On said plate 70 are mounted a pair of annular conductors 72 and two sets of arcuate conductors 73 arranged in circles, all of said conductors being disposed concentrically and in suitable recesses in said plate so as to be flush with the surface thereof. There is one pair of arcuate conductors for the thermocouple of each furnace, the arcuate conductors being marked A to E respectively to correspond with the arcuate conductors 53 above described.

An arm 74 that is a conductor of electricity is mounted on the shaft 66 and has contact points 75 that contact respectively with one set of arcuate conductors 73, say the outer, and one annular conductor 72, say the outer. Mounted on the shaft 66 and spaced away and insulated from said arm 74 is a second arm 76 that is a conductor of electricity and has contact points 77 adapted respectively to engage the other annular conductor 72 and set of arcuate conductors 73.

The annular conductors 72 are connected with the terminals of the temperature indicator by wires 78 and the two arcuate conductors 73 of each set are connected with the ends of the thermocouple 48 of a furnace by wires 79.

Preferably a plate 80 is mounted on the base 71 and on it are mounted a plurality of binding posts 81 (A to E) to which are secured the ends of the wires 79. The binding posts are connected with the arcuate conductors 73 (A to E) by wires 82 (A to E).

The plate 80 is also provided with binding posts 83 to which are secured the wires 78 that lead to the temperature indicator and which are connected with the annular conductors by wires 84.

The shaft 66 is rotated in any suitable way, as by a gear 85 that is driven by a worm 86 on a rotating shaft 87 which receives its motion preferably from a rotating shaft in a temperature recorder or potentiometer, of any suitable type. When the contact points of the conductor arms 74 and 76 are in engagement respectively with the arcuate and annular conductors 73 and 72 of a particular furnace (furnace D Fig. 7) a circuit is closed leading from one end of the thermocouple to an arcuate conductor 73, from the arcuate conductor to an annular conductor 72, from the annular conductor to the temperature indicator, from the temperature indicator back to the other annular conductor 72, from the annular conductor to the other arcuate conductor 73 and from the arcuate conductor back to the other end of the thermocouple.

At the same time that the thermocouple of a particular furnace is connected with the temperature indicator, the solenoid circuit of the fuel valve of that furnace is connected with the circuit of the movable pointer of the temperature indicator. Thus, if the temperature of a furnace reaches the maximum or minimum limit while its thermocouple is connected with the temperature indicator, the fuel valve of the burner for that furnace will be turned if required.

The shaft 66 rotates and thus the thermocouples of the several furnaces are in turn connected with the temperature indicator. The temperature regulating device, makes it possible to maintain furnace temperatures very near the temperatures device. The device is simple and economical and not likely to get out of repair. It operates on a minimum of electric current.

The system described makes it possible to regulate the temperatures of a plurality of furnaces or other units with one temperature indicator. Each furnace thermocouple is in connection with the temperature indicator long enough and frequently enough to successfully and satisfactorily regulate the fuel supply.

Obviously different types of temperature indicators and switch mechanisms from those described may be used, and numerous other changes may be made both in the individual regulating devices and in the system without departing from our invention, and we do not wish to be limited to the precise construction shown.

What we claim is:

1. In a device of the kind described, the combination with a thermocouple, a fuel valve, solenoids for operating said fuel valve and a temperature indicator connectsaid solenoids, of a switch member for operating said solenoids comprising an oscillatable disk, an arcuate conductor thereon, and three contact members disposed in an arc to contact with said arcuate conductor, the middle contact member being in contact with the arcuate conductor at all times, and the outer contact members being each in contact with said arcuate conductor in one position of said disk, and said outer contact members being connected respectively with a solenoid, said switch member being in an electric circuit including said solenoids and said temperature indicator.

2. In a device of the kind described, the combination with a thermocouple, a fuel valve, solenoids for operating said fuel valve and a temperature indicator in circuit with said solenoids, of a switch member for operating said solenoids comprising an oscillatable disk, an arcuate conductor thereon, and three contact members disposed in an arc to contact with said arcuate conductor, the middle contact member being in contact with the arcuate conductor at all times, and the outer contact members being each in contact with said arcuate conductor in one position of said disk, and each of said outer contact members being connected respectively with one of said solenoids, and means tending to hold said disk in moved position, said switch member being in an electric circuit including said solenoids and said temperature indicator.

3. A furnace temperature regulating system comprising a plurality of furnaces, a thermocouple for each furnace, a pair of fuel valves for each furnace, one of said valves being adapted to supply a comparatively large amount of fuel and the other fuel valve being adapted to supply a comparatively small amount of fuel, a valve to admit fuel to said fuel valves one at a time, means for operating said last mentioned valve, a temperature indicator, means for bringing the thermocouples of the several furnaces successively into connection with said temperature indicator, and means operatively connecting said temperature indicator and said valve operating means.

4. A furnace temperature regulating system comprising a plurality of furnaces, a thermocouple for each furnace, a pair of fuel valves for each furnace, one of said valves being adjusted to supply a greater amount of fuel than is required to keep the furnace at the desired temperature and the other fuel valve being adjusted to supply a smaller amount of fuel than is required to keep the furnace at the desired temperature, a valve to supply fuel to said fuel valves, one at a time, solenoids for operating said last mentioned valve, a temperature indicator, means for bringing the thermocouples of the several furnaces successively into connection with said temperature indicator, and means operatively connecting said temperature indicator and said valve operating means.

5. A furnace temperature regulating system, comprising a plurality of furnaces, a thermocouple for each furnace, a pair of fuel valves for each furnace, one of said valves being adjusted to supply a greater amount of fuel than is required to keep the furnace at the desired temperature and the other fuel valve being adjusted to supply a smaller amount of fuel than is required to keep the furnace at the desired temperature, a valve to supply fuel to said fuel valves, one at a time, solenoids for operating said last mentioned valve, a temperature indicator, means for bringing the thermocouples of the several furnaces successively into connection with said temperature indicator, and means for connecting each solenoid circuit with its control circuit when the corresponding thermocouple is connected with the temperature indicator.

6. In a system of the kind described, a plurality of furnaces, a fuel valve for each furnace, a rotary shaft, means for rotating said shaft, a plate disposed transversely of the end of said shaft, an annular conductor of electricity mounted on said plate concentric with said shaft, a plurality of arcuate conductors mounted on said plate and disposed in a circle concentric with said shaft and said annular conductor, a contact plate mounted on the end of said shaft and contacting with said annular conductor and said arcuate conductors, a plurality of oscillatable conductors, a pair of solenoids for each oscillatable conductor, each pair of solenoids being operatively connected with one of said fuel valves, one of which solenoids is connected with said oscillatable conductor at all times, said annular conductor being connected with one terminal of a source of electricity and said arcuate conductors being connected respectively with the other terminal of said source of electricity through one of said oscillatable conductors, and means controlled by the temperature of each furnace for controlling the electric circuit that operates the fuel valve of said furnace.

7. In a system of the kind described, a plurality of furnaces, a fuel valve for each furnace, a rotatable shaft, means for rotating said shaft, a plate disposed transversely of the end of aid shaft, an annular conductor of electricity mounted on said plate concentric with said shaft, a plurality of arcuate conductors mounted on said plate and disposed in a circle concentric with said shaft and said annular conductor, there being one arcuate conductor for each furnace and the circuit through each arcuate conductor constituting the control means for the fuel valve of that furnace, a contact plate mounted on the end of said shaft and contacting with said annular conductor and said arcuate conductors, said annular conductor being connected with one terminal of a source of electricity and said arcuate conductors being connected respectively with the other terminal of said source of electricity, and means controlled by the temperature of each furnace for controlling the electric circuit that operates the fuel valves of said furnace.

8. In a system of the kind described, a plurality of furnaces, a fuel valve for each furnace, a thermocouple for each furnace, a rotatable shaft, means for rotating said shaft, a plate disposed transversely of the end of said shaft, a pair of annular conductors of electricity mounted on said plate concentric with said shaft, a pair of sets of arcuate conductors mounted on said plate and disposed in circles concentric with said annular conductors and said shaft, an arm at the end of said shaft adapted to rotate over said annular and arcuate conductors, said arm having electrical conductors, one of which is adapted to contact with one annular conductor and the members of one set of arcuate conductors and the other of which conductors is adapted to contact with the other annular conductor and set of arcuate conductors, each member of one set of arcuate conductors being connected with one end of the thermocouple of a furnace and the corresponding member of the other set being connected with the other end of said thermocouple, and the annular conductors being in a circuit containing a temperature indicator and means controlled by said temperature indicator for operating said fuel valves.

9. In a system of the kind described, a plurality of furnaces, a fuel valve for each furnace, a thermocouple for each furnace, a rotatable shaft, means for rotating said shaft, a plate disposed transversely of the end of said shaft, an annular conductor of electricity mounted on said plate concentric with said shaft, a plurality of arcuate conductors mounted on said plate and disposed in a circle concentric with said shaft and said annular conductor, a contact plate mounted on the end of said shaft and contacting with said annular conductor and said arcuate conductors, said annular conductor being connected with one terminal of a source of electricity and said arcuate conductors being connected respectively with the other terminal of said source of electricity, said circuit constituting the control means for said fuel valves, a second plate disposed transversely of the other end of said shaft, a pair of annular conductors of electricity mounted on aid second plate concentric with said shaft, a pair of sets of arcuate conductors mounted on said plate and disposed in circle concentric with said annular conductors and said shaft, an arm at the end of said shaft adapted to rotate over said annular and arcuate conductors, said arm having a pair of electrical conductors, one of which is adapted to contact with one annular conductor and the members of one set of arcuate conductors and the other of which conductors is adapted to contact with the other annular conductor and set of arcuate conductors, each member of one set of arcuate conductors being connected with one end of the thermocouple of a furnace and the corresponding member of the other set being connected with the other end of said thermocouple, and the annular conductors being in a circuit containing a temperature indicator, said temperature indicator controlling said fuel valve operating circuit.

Signed at Canton, Ohio, this 21st day of February, 1922.

HARRY W. McQUAID
ALEXANDER G. RIPBERGER